(12) United States Patent
Larsen et al.

(10) Patent No.: US 10,408,706 B2
(45) Date of Patent: Sep. 10, 2019

(54) METHOD AND APPARATUS FOR AIMING A VEHICLE LAMP

(71) Applicant: GM GLOBAL TECHNOLOGY OPERATIONS LLC, Detroit, MI (US)

(72) Inventors: Michael K. Larsen, Sterling Heights, MI (US); Gregory M. Castillo, Windsor (CA)

(73) Assignee: GM Global Technology Operations LLC, Detroit, MI (US)

(*) Notice: Subject to any disclaimer, the term of this patent is extended or adjusted under 35 U.S.C. 154(b) by 273 days.

(21) Appl. No.: 15/638,721

(22) Filed: Jun. 30, 2017

(65) Prior Publication Data

US 2019/0001866 A1 Jan. 3, 2019

(51) Int. Cl.
*G01M 11/06* (2006.01)
*B60Q 1/00* (2006.01)

(52) U.S. Cl.
CPC ......... *G01M 11/06* (2013.01); *B60Q 1/0023* (2013.01)

(58) Field of Classification Search
None
See application file for complete search history.

(56) References Cited

U.S. PATENT DOCUMENTS

| | | | | |
|---|---|---|---|---|
| 3,077,139 A | * | 2/1963 | Todd | G01M 11/061 33/645 |
| 3,532,432 A | * | 10/1970 | Mansour | G01M 11/06 356/121 |
| 3,746,449 A | * | 7/1973 | Schick | G01M 11/06 356/121 |
| 4,804,265 A | * | 2/1989 | Baukol | G01B 11/26 33/288 |
| 5,078,490 A | * | 1/1992 | Oldweiler | G01M 11/067 33/288 |
| 7,876,427 B1 | * | 1/2011 | Melvin | G01M 11/064 356/121 |
| 2006/0256320 A1 | * | 11/2006 | Peterson | G01J 1/06 356/121 |

OTHER PUBLICATIONS

"Surface Vehicle Standard", SAE International, J599 Nov. 2015—Lighting Inspection Code.

* cited by examiner

*Primary Examiner* — Christian Chace
*Assistant Examiner* — Katherine Marie Fitzharris
(74) *Attorney, Agent, or Firm* — Quinn IP Law (57) ABSTRACT

A device for detecting a light beam projecting from a lamp of a vehicle is described, and includes a plurality of photo-sensors and a plurality of indicator bulbs. The photo-sensors are arranged in a linear array along a first axis, and the indicator bulbs are arranged in a linear array along a second axis that is in parallel to the first axis. A controller is in communication with the photo-sensors and the indicator bulbs. The controller includes an instruction set that is executable to monitor signal inputs from the plurality of photo-sensors to detect presence of a light beam projecting from the lamp of a vehicle, determine a cut-off gradient line for the light beam based thereon, and illuminate one of the indicator bulbs to indicate a location of the cut-off gradient line for the light beam.

19 Claims, 4 Drawing Sheets

METHOD AND APPARATUS FOR AIMING A VEHICLE LAMP

Alignment of vehicle headlamps can benefit from aiming devices and methods.

SUMMARY

A device for detecting a light beam projecting from a lamp of a vehicle is described, and includes a plurality of photo-sensors and a plurality of indicator bulbs that are disposed on a board. The photo-sensors are arranged in a linear array along a first axis, and the indicator bulbs are arranged in a linear array along a second axis that is in parallel to the first axis. A controller is in communication with the photo-sensors and the indicator bulbs. The controller includes an instruction set that is executable to monitor signal inputs from the plurality of photo-sensors to detect presence of a light beam projecting from the lamp of a vehicle onto the board, determine a cut-off gradient line for the light beam based thereon, and illuminate one of the indicator bulbs to indicate a location of the cut-off gradient line for the light beam on the board.

An aspect of the disclosure includes the instruction set being executable to determine a plurality of light gradients based upon the monitored inputs from adjacent pairs of the plurality of photo-sensors and determine the cut-off gradient line for the light beam based upon the plurality of light gradients, wherein the cut-off gradient line indicates a maximum one of the plurality of light gradients.

Another aspect of the disclosure includes the instruction set being further executable to illuminate the one of the plurality of indicator bulbs that corresponds to the adjacent pairs of the plurality of photo-sensors that are associated with the maximum one of the plurality of light gradients to indicate the location of the cut-off gradient line for the light beam on the board.

Another aspect of the disclosure includes the instruction set being further executable to illuminate the one of the plurality of indicator bulbs that corresponds to the one of the plurality of photo-sensors that is associated with the maximum one of the plurality of light gradients to indicate the location of the cut-off gradient line for the light beam on the board.

Another aspect of the disclosure includes the plurality of indicator lamps being a plurality of LEDs.

Another aspect of the disclosure includes the first axis for the plurality of photo-sensors and the second axis for the plurality of indicator bulbs being vertically disposed.

Another aspect of the disclosure includes the board having a horizontally-oriented calibration line.

Another aspect of the disclosure includes the first axis for the plurality of photo-sensors and the second axis for the plurality of indicator bulbs being horizontally disposed.

Another aspect of the disclosure includes the instruction set being executable to determine a vertical cut-off gradient line for the light beam based upon the signal inputs from the plurality of photo-sensors.

Another aspect of the disclosure includes the lamp being an adaptive driving beam.

Another aspect of the disclosure includes the lamp being one of a headlamp, a visual optical aim headlamp, or a fog lamp.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

The appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

Figure 1:
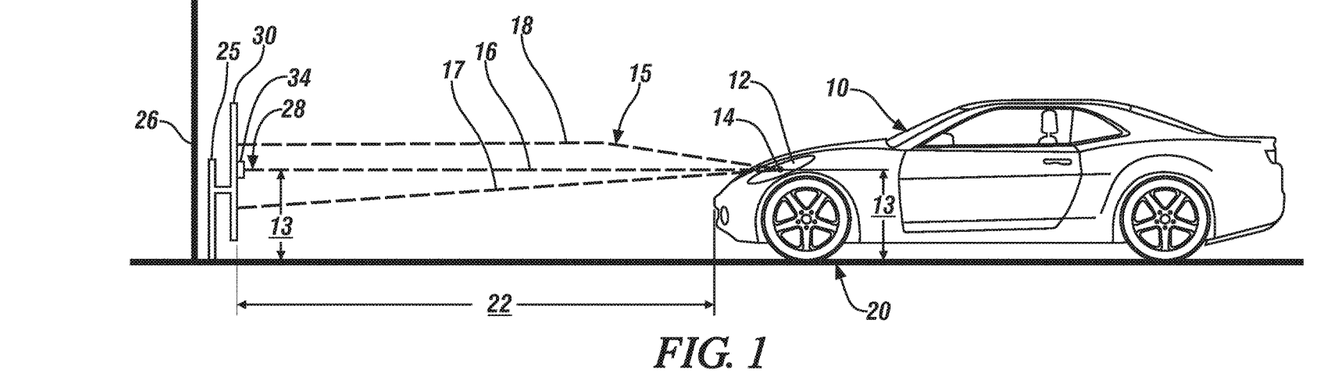
FIG. 1 schematically illustrates a side-view of a lamp alignment setup including a vehicle in relation to a headlamp aiming device, in accordance with the disclosure.
Figure 2:
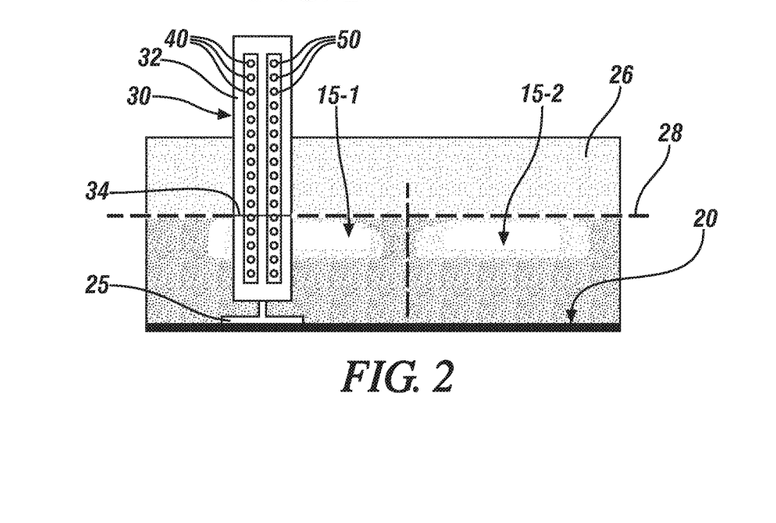
FIG. 2 schematically illustrates a front-view of a lamp alignment setup including a vertically-oriented headlamp aiming device and a back screen with light beams projected thereon, in accordance with the disclosure.

Referring to the drawings, wherein like reference numerals correspond to like or similar components throughout the several Figures, FIG. 1 schematically illustrates a side-view of a headlamp aiming device 30 that is disposed on a level surface 20 and positioned facing a vehicle 10, and FIG. 2 schematically illustrates a front-view of the headlamp aiming device 30. As shown with reference to FIG. 1, the vehicle 10 is facing the headlamp aiming device 30 at a preset distance 22 from the front of the vehicle 10. The vehicle 10 may include, but not be limited to a mobile platform in the form of a commercial vehicle, industrial vehicle, agricultural vehicle, passenger vehicle, a motorcycle or another 2-wheeled vehicle, aircraft, train, all-terrain vehicle, personal movement apparatus, robot and the like to accomplish the purposes of this disclosure.

The headlamp aiming device 30 is preferably mounted on a mounting stand 25 and is oriented to face the front of the vehicle 10. The headlamp aiming device 30 includes a board 32, a calibration line 34, a plurality of photo-sensors 40 disposed in a linear array along a first, vertically-oriented axis 42 and a plurality of indicator bulbs 50 disposed in a linear array along a second axis 52 that is parallel to the first axis 42. A vertically-oriented back screen 26 may also be mounted on or behind the mounting stand 25. The vertically-oriented back screen 26 is included herein to assist in describing the concepts of the disclosure, but may be omitted in practice and implementation. The headlamp aiming device 30 is preferably mounted on the mounting stand 25, and the back screen 26 may also be mounted on the mounting stand 25 or behind the mounting stand 25. The mounting stand 25 can be fixedly secured onto the level surface 22, or alternatively, can be positioned on the level surface 22 and be capable of being moved by an operator.

The vehicle 10 includes a lamp 12 that is mounted on a front portion of the vehicle 10 and can be operated to forwardly project a single light beam 15. Embodiments of the lamp 12 may include a headlamp, a fog lamp, an adaptive driving beam headlamp, or another illuminating device. The lamp 12 as shown is a headlamp that is mounted on the left, driver's side of the front of the vehicle 10. It is appreciated that there can be two headlamps, with a first of the headlamps mounted on the left, driver's side of the front of the vehicle 10 and a second of the headlamps mounted on the right, passenger's side of the front of the vehicle 10. The lamp 12 includes a lamp bulb that has a center point 14, also referred to as an H-V point. The light beam 15 projects a light pattern that can be characterized in terms of a center line 16, a lower line 17 and an upper line 18 when viewed from the side. The center line 16 is aligned with the center point 14 of the lamp 12, and the center line 16, lower line 17 and upper line 18 describe the boundaries of the light beam 15 as projected from the lamp 12 when viewed from the side. When projected onto a vertical surface, e.g., onto the headlamp aiming device 30 and/or the back screen 26, the light beam 15 can be further characterized as having a horizontal cut-off gradient line 28 that provides an objective measurement of a maximum light/dark boundary of the light beam 15.

FIG. 2 schematically illustrates a front view of an embodiment of the headlamp aiming device 30 and the optional back screen 26, with a pair of light beams 15-1 and 15-2 projected thereon. The light beam indicated by numeral 15-1 is associated with the left, driver's side headlamp of the facing vehicle (not shown) and the light beam indicated by numeral 15-2 is associated with the right, passenger side headlamp of the facing vehicle. The headlamp aiming device 30 is configured to detect one or multiple light beams that are projected from the lamp(s) of the vehicle 10 to facilitate vertical aiming by detecting light gradients and determining a maximum light gradient. A light gradient is defined as a difference in light intensity between two or more locations of a light beam. The headlamp aiming device 30 is configured to locate a vertical (as shown) or horizontal position of a maximum value for a light gradient for one of the light beams 15-1, 15-2 that is projecting from one of the lamps of the vehicle 10. The vertical position of the maximum value for the light gradient for one of the light beams 15-1, 15-2 projecting from one of the lamps of the vehicle 10 can be employed to vertically aim the associated lamp.

The headlamp aiming device 30 includes the board 32, calibration line 34, the photo-sensors 40 disposed in a linear array along the first axis 42 and the indicator bulbs 50 disposed in a linear array along the second axis 52 that is parallel to the first axis 42. Each of the indicator bulbs 50 is vertically aligned with a corresponding one of the photo-sensors 40, in one embodiment. Alternatively, each of the indicator bulbs 50 is vertically aligned between a corresponding pair of the photo-sensors 40. The board 32 can be a rigid, rectangular, flat sheet that is fabricated from non-conductive, non-reflective material. The board 32 is mounted in a vertical manner on the mounting stand 25, and can be vertically adjusted such that the calibration line 34 is arranged at a vertical height that is equal to the center point 14 of the lamp 12 in one embodiment. Additional details related to the headlamp aiming device 30 are described with reference to FIGS. 3 and 4.

The light beam 15 from the lamp 12 is projected onto the back screen 26, and includes the horizontal cut-off gradient line 28 that indicates a maximum value for the light gradient, which provides an objective measurement of a light/dark boundary in the light beam 15. The cut-off gradient line 28 associated with the beam 15 from the lamp 12 is indicated in relation to the calibration line 34 that is indicated on the headlamp aiming device 30. When the lamp 12 is aimed on the vehicle 10 in accordance with its specification, the cut-off gradient line 28 of the beam 15 from the lamp 12 is aligned vertically with the calibration line 34 on the headlamp aiming device 30.

A process of aiming the lamp 12 can include placing the vehicle 10 on the surface 20 such that the lamp 12 projects the light beam 15 onto the headlamp aiming device 30 at a predetermined horizontal distance 22. A vertical height 13 between the center point 14 of the lamp 12 and the surface 20 is determined, and the headlamp aiming device 30 is vertically adjusted such that the calibration line 34 is positioned at the vertical height 13 from the surface 20. When the light beam 15 of the lamp 12 is projected onto the headlamp aiming device 30, the cut-off gradient line 28 of the light beam 15 is expected to align with the calibration line 34 of the headlamp aiming device 30. Adjustments in the vertical orientation of the lamp 12 can be made in the vehicle 10 to ensure that the cut-off gradient line 28 of the light beam 15 aligns with the calibration line 34 indicated on the headlamp aiming device 30.

Figure 3:
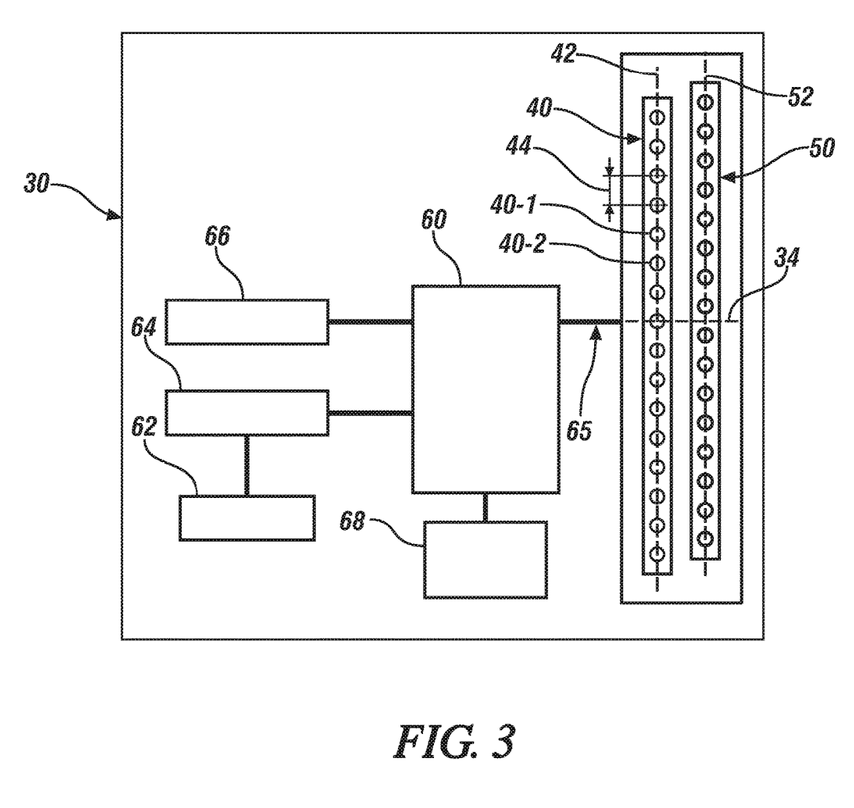
FIG. 3 schematically illustrates an embodiment of the headlamp aiming device disposed in a vertical orientation, in accordance with the disclosure.

FIG. 3 schematically shows a first embodiment of the headlamp aiming device 30, with continued reference to elements shown with reference to FIGS. 1 and 2. In this embodiment, the plurality of photo-sensors 40 are disposed on the board 32 in a linear array along the first axis 42 and the plurality of indicator bulbs 50 are disposed on the board 32 in a linear array along the second axis 52 that is parallel to the first axis 42. In this embodiment the first and second axes 42, 52 are vertically aligned. As such, the plurality of photo-sensors 40 can be employed to sense and measure light gradients in the vertical, up/down direction. The photo-sensors 40 are disposed on the board 32 in a linear array along the first axis 42 at a suitable spacing interval 44. In one embodiment, the spacing interval 44 is 6 mm (0.25 inches). In one embodiment, the spacing interval 44 is 10 mm (0.40 inches). The indicator bulbs 50 are disposed on the board 32 in a linear array along the second axis 52 at the same spacing interval 44. In one embodiment, the vertical positions of the indicator bulbs 50 are offset from the vertical positions of the corresponding photo-sensors 40 such that each of the indicator bulbs 50 indicates a vertical midway point between adjacent pairs of the photo-sensors 40. In one embodiment, the vertical positions of the indicator bulbs 50 are aligned with the vertical positions of the corresponding photo-sensors 40.

Each of the photo-sensors 40 is a device that generates a signal in response to light intensity, which can be measured in units of lux. In one embodiment, the photo-sensor 40 is a photo-resistor, which exhibits a resistance and a change in resistance based upon the light intensity. In one embodiment, photo-sensor 40 is a photo-diode or photo-transistor, which exhibits a current flow and a change in current flow based upon the light intensity. Each of the indicator bulbs 50 is an LED or another lamp or illuminable device that is capable of providing a visually-discernible indication of a maximum one of the light gradients. Alternatively or in addition, each of the indicator bulbs 50 may include capability for audible, haptic or another discernible indication of a maximum one of the light gradients.

A light gradient can be determined between adjacent pairs of the photo-sensors 40. One adjacent pair of the photo-sensors 40 is indicated by numerals 40-1 and 40-2. The light gradient for the respective adjacent pair of photo-sensors 40-1 and 40-2 is determined as a difference between the light intensities measured by the photo-sensors 40-1 and 40-2.

The headlamp aiming device 30 also includes a micro-controller 60, a DC power source 62, a voltage regulator 64, a levelling sensor 66 and one or a plurality of input devices 68, which may be in the form of operator-selected switches. A printed wiring board (PWB) 65 or another form of electrical connection is disposed to provide signal communication between the micro-controller 60, each of the plurality of photo-sensors 40 and each of the plurality of indicator bulbs 50. The voltage regulator 64 supplies regulated DC electric power to energize the levelling sensor 66 and the micro-controller 60. In one embodiment, the levelling sensor 66 is coupled to the orientations of the first and second axes 42, 52, and generates a signal that indicates such orientation with regard to a vertical orientation. Furthermore, the levelling sensor 66 is disposed to generate a signal that is communicated to the micro-controller 60. The micro-controller 60 can employ the signal from the levelling sensor 66 to control operation of the headlamp aiming device 30, including disabling its operation under conditions when the headlamp aiming device 30 is not vertically oriented. The micro-controller 60 can include an instruction set that is executable to monitor signal inputs from the plurality of photo-sensors 40, which are oriented to detect presence of a light beam projecting from one of the lamps of a subject vehicle. This includes determining a plurality of light gradients based upon the signal inputs from adjacent pairs of the plurality of photo-sensors 40. The micro-controller 60 can determine the cut-off gradient line 28 for the light beam 15 based upon the plurality of light gradients, wherein the cut-off gradient line 28 indicates a maximum one of the plurality of light gradients as measured by the plurality of photo-sensors 40. The micro-controller 60 can issue a command to illuminate the one of the plurality of indicator bulbs 50 that corresponds to the adjacent pairs of the plurality of photo-sensors 40 that are associated with the maximum one of the plurality of light gradients to indicate the location of the cut-off gradient line 28 for the light beam 15 on the board 32. Alternatively, the micro-controller 60 can issue a command to illuminate those indicator bulbs 50 that are positioned below the cut-off gradient line 28 for the light beam 15, wherein the cut-off gradient line 28 for the light beam 15 is associated with the maximum one of the plurality of light gradients corresponding to the adjacent pairs of the plurality of photo-sensors 40. Alternatively, the micro-controller 60 can issue a command to illuminate those indicator bulbs 50 that are positioned above the cut-off gradient line 28 for the light beam 15.

The headlamp aiming device 30 can operate in at least two modes, which can be selected by an operator input to the input devices 68. In a first mode, the headlamp aiming device 30 is set to be responsive to the light beam 15, and operates to detect and identify the vertical location of the cut-off gradient line 28 for the light beam 15. In a second mode, the headlamp aiming device 30 is controlled to provide a setpoint for the cut-off gradient line 28 of the light beam 15, e.g., at the calibration line 34. An operator or an aiming device can adjust aiming of the respective lamp 12 to adjust the light beam 15 so the cut-off gradient line 28 for the light beam 15 corresponds to the calibration line 34 that is indicated on the headlamp aiming device 30.

The term "micro-controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. A parameter is defined as a measurable quantity that represents a physical property of a device or other element that is discernible using one or more sensors and/or a physical model. A parameter can have a discrete value, e.g., either "1" or "0", or can be infinitely variable in value.

Figure 4:
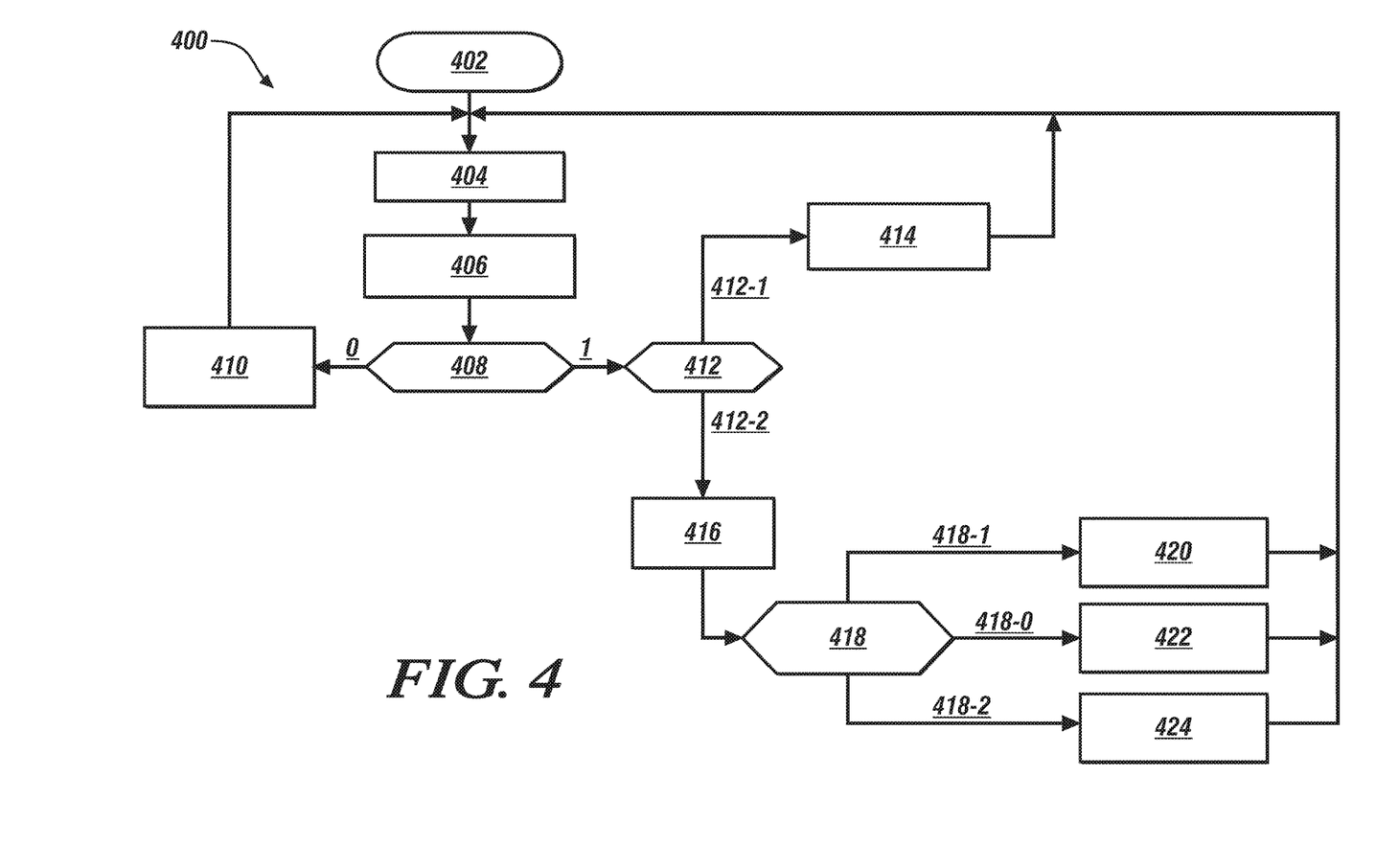
FIG. 4 schematically illustrates a flowchart for a lamp calibration routine that includes a process for aiming a lamp of a vehicle employing an embodiment of the lamp aiming device, in accordance with the disclosure.

FIG. 4 schematically shows a lamp calibration routine 400 that includes a process for aiming lamp 12 of the vehicle 10 described herein, employing an embodiment of the headlamp aiming device 30 described with reference to FIGS. 1, 2 and 3. The lamp calibration routine 400 can be reduced to executable code that is stored and executed in the micro-controller 60. Table 1 is provided as a key wherein the numerically labeled blocks and the corresponding functions are set forth as follows, corresponding to the lamp calibration routine 400. The teachings may be described herein in terms of functional and/or logical block components and/or various processing steps. The block components may be composed of hardware, software, and/or firmware components that have been configured to perform the specified functions.

TABLE 1

| BLOCK | BLOCK CONTENTS |
|---|---|
| 402 | Start (power applied) or Stop (power removed) |
| 404 | Read light sensor values from photo-sensors |
| 406 | Compare light sensor values to establish cut-off gradient line |
| 408 | Is cut-off gradient line detected? |
| 410 | Set cut-off gradient line status indicator to no cut-off gradient line detected |
| 412 | Detect Mode |
| 414 | Mode 1 selected - Indicate cut-off gradient line |
| 416 | Mode 2 selected - Indicate target cut-off gradient line |
| 418 | Compare measured cut-off gradient line in relation to target cut-off gradient line |
| 420 | Measured < Target Command higher aim |
| 422 | Measured = Target Indicate action is complete |
| 424 | Measured > Target Command lower aim |

Execution of the lamp calibration routine 400 may proceed as follows. The steps of the lamp calibration routine 400 may be executed in a suitable order, and are not limited to the order described with reference to FIG. 4. The micro-controller 60 starts executing the lamp calibration routine 400 when power is applied (402), which can occur when the battery 62 is electrically connected to the voltage regulator 64, which is able to supply electric power to the micro-controller 60. A signal from the leveling sensor 66 indicates that the headlamp aiming device 30 has been properly set up and is able to monitor and evaluate the light beam 15 from the lamp 12. The signal outputs from the photo-sensors 40 are monitored to determine a plurality of light gradients based upon the signal inputs from adjacent pairs of the photo-sensors 40 (404). The micro-controller 60 can determine the cut-off gradient line 28 for the light beam 15 based upon the plurality of light gradients, wherein the cut-off gradient line 28 indicates a maximum one of the plurality of light gradients as measured by the plurality of photo-sensors 40 (406).

When no cut-off gradient line is detected (408)(0), a status indicator is set to indicate that no cut-off gradient line has been detected (410) and the process repeats steps 404, 406 and 408.

When a cut-off gradient line has been detected (408)(1), the mode of operation, e.g., as indicated by input to the input switches 68, is determined (412). When Mode 1 has been selected (412-1), the headlamp aiming device 30 is set to be responsive to the light beam 15, and operates to detect and identify the vertical location of the cut-off gradient line 28 for the light beam 15. The micro-controller 60 controls the indicator bulbs 50 to indicate the location of the cut-off gradient line 28 for the light beam 15 (414). In Mode 1, the micro-controller 60 can issue a command to illuminate the one of the plurality of indicator bulbs 50 that corresponds to the adjacent pairs of the plurality of photo-sensors 40 that are associated with the maximum one of the plurality of light gradients to indicate the location of the cut-off gradient line 28 for the light beam 15 on the board 32. This operation continues until the power from the battery 62 has been removed from the micro-controller 60.

When Mode 2 has been selected (412-2), the headlamp aiming device 30, the headlamp aiming device 30 is controlled to provide a setpoint for the cut-off gradient line 28 of the light beam 15, e.g., at the calibration line 34 (416), and continues to monitor the light beam 15 in relation to the calibration line 34 (418).

An operator or an aiming device can adjust aiming of the respective lamp 12 to adjust the light beam 15 so the cut-off gradient line 28 for the light beam 15 corresponds to the calibration line 34 of the headlamp aiming device 30 (418). When the monitored light beam 15 is less than the calibration line 34 (Measured<Target) (418-1), the micro-controller 60 can issue a command to aim the light beam 15 higher (420). When the monitored light beam 15 is greater than the calibration line 34 (Measured>Target) (418-2), the micro-controller 60 can issue a command to aim the light beam 15 lower (424). When the monitored light beam 15 is equal to the calibration line 34 (Measured=Target) (418-0), the micro-controller 60 can indicate that the light beam 15 is on-target (422). Although the various steps shown in the flowchart diagram appear to occur in a chronological sequence, at least some of the steps may occur in a different order, and some steps may be performed concurrently or not at all.

An adaptive driving beam is a long-range forward visibility light beam that adapts to the presence of opposing and preceding vehicles by modifying portions of the projected light beam in order to reduce glare to the drivers/riders of oncoming vehicles and preceding vehicles, i.e., vehicles that are travelling in the same direction in front of the subject vehicle. In one embodiment, the adaptive driving beam selectively blocks a portion of the light beam.

Figure 5:
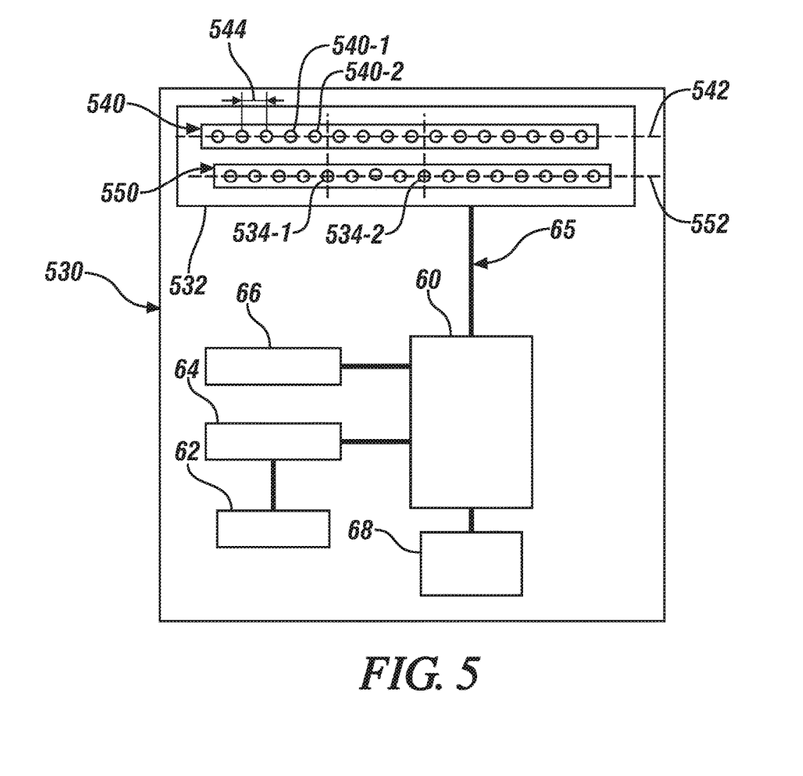
FIG. 5 schematically illustrates an embodiment of the headlamp aiming device disposed in a horizontal orientation, in accordance with the disclosure.

FIG. 5 schematically shows another embodiment of the headlamp aiming device 530, with continued reference to some of the elements shown with reference to FIGS. 1 and 2. In this embodiment, the plurality of photo-sensors 540 are disposed on a board 532 in a linear array along the first axis 542 and the plurality of indicator bulbs 550 are disposed on the board 532 in a linear array along the second axis 552 that is parallel to the first axis 542. In this embodiment the first and second axes 542, 552 are horizontally aligned. As such, the plurality of photo-sensors 540 can be employed to sense and measure light gradients in the horizontal, side-to-side direction. This configuration can be employed to calibrate horizontal alignment of a light beam from a lamp, an example of which includes calibrating a horizontal alignment of an adaptive driving beam for a vehicle.

The photo-sensors 540 are disposed on the board 532 in a linear array along the first axis 542 at a suitable spacing interval 544 between individual ones of the photo-sensors 540. In one embodiment, the photo-sensors 540 are equally spaced at an interval 544 of is 6 mm (0.25 inches). In one embodiment, the spacing interval 544 is 10 mm (0.40 inches). The indicator bulbs 550 are disposed on the board 532 in a linear array along the second axis 552 at the same spacing interval 544. In one embodiment, the horizontal positions of the indicator bulbs 550 are offset from the horizontal positions of the corresponding photo-sensors 540 such that each of the indicator bulbs 550 indicates a horizontal midway point between adjacent pairs of the photo-sensors 540. In one embodiment, the horizontal positions of the indicator bulbs 550 are aligned with the horizontal positions of the corresponding photo-sensors 540. Alternatively, the photo-sensors 540 are disposed on the board 532 in a linear array along the first axis 542 at a variable spacing interval between individual ones of the photo-sensors 540, wherein the spacings between the photo-sensors 540 at the outer portions of the board 532 are wider than the spacings between the photo-sensors 540 at the horizontal center of the board 532. Such an arrangement facilitates determining a rough approximation for the location of each of the beams at the outer portions, and a fine rough approximation for the location of each of the beams at the horizontal center of the board 532 for precise aiming of the cut-off gradient of each of the beams.

The headlamp aiming device 530 also includes micro-controller 60, DC power source 62, a voltage regulator 64, a levelling sensor 66 and one or a plurality of input devices 68, which may be in the form of operator-selected switches. A printed wiring board (PWB) 65 or another form of electrical connection is disposed to provide signal communication between the micro-controller 60, each of the plurality of photo-sensors 540 and each of the plurality of indicator bulbs 550. The voltage regulator 64 supplies regulated DC electric power to energize the levelling sensor 66 and the micro-controller 60.

Each of the photo-sensors 540 is a device that generates a signal in response to light intensity, which can be measured in units of lux. In one embodiment, the photo-sensor 540 is a photo-resistor, which exhibits a resistance and a change in resistance based upon the light intensity. In one embodiment, photo-sensor 540 is a photo-diode or photo-transistor, which exhibits a current flow and a change in current flow based upon the light intensity.

A light gradient can be determined between adjacent pairs of the photo-sensors 540. One adjacent pair of the photo-sensors 540 is indicated by numerals 540-1 and 540-2. The light gradient for the respective adjacent pair of photo-sensors 540-1 and 540-2 is determined as a difference between the light intensities measured by the photo-sensors 540-1 and 540-2. Left and right calibration lines 534-1 and 534-2, respectively, are also indicated.

In one embodiment, the levelling sensor 66 is coupled to the orientations of the first and second axes 542, 552, and generates a signal that indicates such orientation with regard to a horizontal orientation. Furthermore, the levelling sensor 66 is disposed to generate a signal that is communicated to the micro-controller 60. The micro-controller 60 can employ the signal from the levelling sensor 66 to control operation of the headlamp aiming device 530, including disabling its operation under conditions when the headlamp aiming device 530 is not horizontally oriented.

The micro-controller 60 can include an instruction set that is executable to monitor signal inputs from the plurality of photo-sensors 540, which are oriented to detect presence of a light beam projecting from one of the lamps of a subject vehicle. This includes determining a plurality of light gradients based upon the signal inputs from adjacent pairs of the plurality of photo-sensors 540. The micro-controller 60 can determine a cut-off gradient line for a light beam based upon the plurality of light gradients, wherein the cut-off gradient line indicates a maximum one of the plurality of light gradients in the horizontal direction. The micro-controller 60 can issue a command to illuminate the one of the plurality of indicator bulbs 550 that corresponds to the adjacent pairs of the plurality of photo-sensors 540 that are associated with the maximum one of the plurality of light gradients to indicate the location of the cut-off gradient line for the light beam on the board 532 in the horizontal direction. Alternatively, the micro-controller 60 can issue a command to illuminate those indicator bulbs 550 that are positioned to the left and/or the right of the cut-off gradient line for the light beam, wherein the cut-off gradient line for the light beam is associated with the maximum one of the plurality of light gradients corresponding to the adjacent pairs of the plurality of photo-sensors 540. Alternatively, the micro-controller 60 can issue a command to illuminate those indicator bulbs 550 that are positioned to the right and/or left the cut-off gradient line for the light beam.

Figure 6:
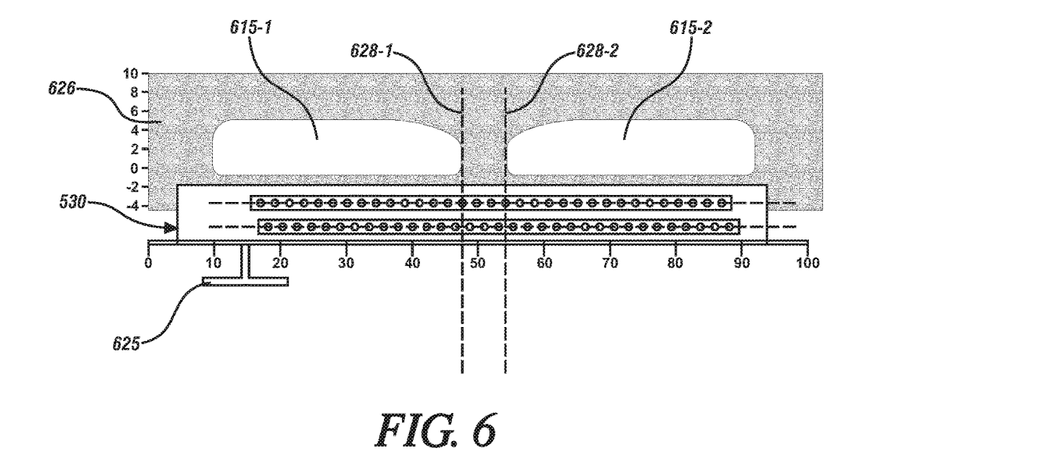
FIG. 6 schematically illustrates a front-view of a lamp alignment setup including a horizontally-oriented headlamp aiming device and a back screen with light beams projected thereon, in accordance with the disclosure.

FIG. 6 schematically illustrates a front-view of the embodiment of the headlamp aiming device 530 described with reference to FIG. 5 and a vertically-oriented back screen 626 that is mounted on or behind a mounting stand 625, with a pair of light beams 615-1 and 615-2 projected thereon. The light beam indicated by numeral 615-1 is associated with the left, driver's side headlamp of the facing vehicle (not shown) and the light beam indicated by numeral 615-2 is associated with the right, passenger side headlamp of the facing vehicle. The headlamp aiming device 530 is configured to detect the pair of light beams 615-1 and 615-2 that are projected from the headlamps of the vehicle 10 to facilitate horizontal aiming by detecting light gradients in the horizontal direction and determining maximum light gradients. The headlamp aiming device 530 is configured to locate a horizontal position of a maximum value for a light gradient for one or both of the light beams 615-1, 615-2 that is projecting from the lamps of the vehicle 10. The horizontal positions of the maximum values for the light gradients are indicated by cut-off gradient lines 628-1 and 628-2 for the light beams 615-1, 615-2 respectively. The cut-off gradient lines 628-1 and 628-2 projecting from one of the lamps of the vehicle 10 can be employed to aim the associated vehicle headlamps in the horizontal direction. Such a configuration can be employed to aim an adaptive driving beam.

The concepts described herein apply to aiming of various light beam patterns. This includes aiming of a light beam pattern having visual optical aim pattern that includes vertical aiming of a horizontal cut-off gradient line. This also includes aiming of a light beam pattern that includes a vertically-oriented gradient line in addition to vertical aiming of a horizontal cut-off gradient line.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A device for detecting a light beam projecting from a lamp of a vehicle, comprising:
    a board;
    a plurality of photo-sensors disposed as a linear array on the board along a first axis;
    a plurality of indicator bulbs disposed as a linear array on the board along a second axis in parallel to the first axis;
    a controller, in communication with the plurality of photo-sensors and in communication with the plurality of indicator bulbs, the controller including an instruction set, the instruction set executable to:

monitor signal inputs from the plurality of photo-sensors, detect presence of a light beam projecting from the lamp of a vehicle onto the board based upon the signal inputs from the plurality of photo-sensors, determine a cut-off gradient line for the light beam based upon the signal inputs from the plurality of photo-sensors, and illuminate one of the plurality of indicator bulbs to indicate a location of the cut-off gradient line for the light beam on the board.

2. The device of claim 1, wherein the instruction set is further executable to:

determine a plurality of light gradients based upon the monitored inputs from adjacent pairs of the plurality of photo-sensors; and determine the cut-off gradient line for the light beam based upon the plurality of light gradients, wherein the cut-off gradient line indicates a maximum one of the plurality of light gradients.

3. The device of claim 2, wherein the instruction set is further executable to illuminate one of the plurality of indicator bulbs that corresponds to the adjacent pairs of the plurality of photo-sensors that are associated with the maximum one of the plurality of light gradients to indicate the location of the cut-off gradient line for the light beam on the board.

4. The device of claim 2, wherein the instruction set is further executable to illuminate one of the plurality of indicator bulbs that corresponds to the one of the plurality of photo-sensors that is associated with the maximum one of the plurality of light gradients to indicate the location of the cut-off gradient line for the light beam on the board.

5. The device of claim 1, wherein the plurality of indicator bulbs comprises a plurality of LEDs.

6. The device of claim 1, wherein the first axis for the plurality of photo-sensors and the second axis for the plurality of indicator bulbs are vertically disposed.

7. The device of claim 6, wherein the board includes a horizontally-oriented calibration line.

8. The device of claim 1, wherein the first axis for the plurality of photo-sensors and the second axis for the plurality of indicator bulbs are horizontally disposed.

9. The device of claim 8, wherein the instruction set is executable to determine a vertical cut-off gradient line for the light beam based upon the signal inputs from the plurality of photo-sensors.

10. The device of claim 8, wherein adjacent ones of the photo-sensors are equally spaced.

11. The device of claim 8, wherein adjacent ones of the photo-sensors at outer portions of the board are set at a first spacing that is wider than a second spacing between adjacent ones of the photo-sensors near a horizontal center of the board.

12. The device of claim 1, wherein the lamp comprises an adaptive driving beam.

13. The device of claim 1, wherein the lamp comprises one of a headlamp, a visual optical aim headlamp, or a fog lamp.

14. A device for detecting light beams projecting from lamps of a vehicle, comprising:

a plurality of photo-sensors disposed in a linear array along a first axis;

a plurality of indicator bulbs disposed in a linear array along a second axis in parallel to the first axis and corresponding to the plurality of photo-sensors;

a controller, in communication with the plurality of photo-sensors and in communication with the plurality of indicator bulbs, the controller including an instruction set, the instruction set executable to:

monitor signal inputs from the plurality of photo-sensors, detect presence of a light beam projecting from the lamp of a vehicle based upon the signal inputs from the plurality of photo-sensors, determine a cut-off gradient line for the light beam based upon the signal inputs from the plurality of photo-sensors, and illuminate one of the plurality of indicator bulbs to indicate a location of the cut-off gradient line for the light beam.

15. The device of claim 14, wherein the instruction set is executable to:

determine a plurality of light gradients based upon the monitored inputs from adjacent pairs of the plurality of photo-sensors; and determine the cut-off gradient line for the light beam based upon the plurality of light gradients, wherein the cut-off gradient line indicates a maximum one of the plurality of light gradients.

16. The device of claim 15, wherein the instruction set is further executable to illuminate the one of the plurality of indicator bulbs that corresponds to the adjacent pairs of the plurality of photo-sensors that are associated with the maximum one of the plurality of light gradients to indicate the location of the cut-off gradient line for the light beam.

17. The device of claim 15, wherein the instruction set is further executable to illuminate the one of the plurality of indicator bulbs that corresponds to the one of the plurality of photo-sensors that is associated with the maximum one of the plurality of light gradients to indicate the location of the cut-off gradient line for the light beam.

18. The device of claim 14, wherein the first axis for the plurality of photo-sensors and the second axis for the plurality of indicator bulbs are vertically disposed.

19. The device of claim 14, wherein the first axis for the plurality of photo-sensors and the second axis for the plurality of indicator bulbs are horizontally disposed.

* * * * *